United States Patent
Albou

(10) Patent No.: US 10,591,129 B2
(45) Date of Patent: Mar. 17, 2020

(54) LIGHTING DEVICE FOR A VEHICLE, COMBINING TWO LIGHT SOURCES

(71) Applicant: VALEO VISION, Bobigny (FR)

(72) Inventor: Pierre Albou, Bobigny (FR)

(73) Assignee: VALEO VISION, Bobigny (FR)

(*) Notice: Subject to any disclaimer, the term of this patent is extended or adjusted under 35 U.S.C. 154(b) by 76 days.

(21) Appl. No.: 15/857,675

(22) Filed: Dec. 29, 2017

(65) Prior Publication Data

US 2018/0187852 A1    Jul. 5, 2018

(30) Foreign Application Priority Data

Jan. 2, 2017  (FR) .................................... 17 50015

(51) Int. Cl.
*F21V 11/00* (2015.01)
*F21S 41/20* (2018.01)
(Continued)

(52) U.S. Cl.
CPC ............ *F21S 41/285* (2018.01); *B60Q 1/085* (2013.01); *B60Q 1/1415* (2013.01); *B60Q 1/20* (2013.01);
(Continued)

(58) Field of Classification Search
CPC ........ F21S 41/285; F21S 45/70; F21S 41/176; F21S 41/153; F21S 41/125; F21S 41/16;
(Continued)

(56) References Cited

U.S. PATENT DOCUMENTS 6,366,384 B1 * 4/2002 Aoki .................... G02B 26/123
                                                             347/233
2016/0146419 A1    5/2016 Reinprecht
(Continued)

FOREIGN PATENT DOCUMENTS

DE    10 2015 222 188 B3    11/2016
FR        3 008 477 A1      1/2015
(Continued)

OTHER PUBLICATIONS

French Preliminary Search report dated Sep. 11, 2017 in French Application 17 50015, filed on Jan. 2, 2017 ( with English Translation of Categories of cited documents).

*Primary Examiner* — Thien T Mai
(74) *Attorney, Agent, or Firm* — Oblon, McClelland, Maier & Neustadt, L.L.P.

(57) ABSTRACT

The lighting device for a vehicle has two light sources and a wavelength conversion device excited by the combination of the radiations from the two light sources. A first light source is associated with a scanning system projecting, by scanning, a first light radiation onto a first conversion region of the device, while a second light source with semiconductors emits a second light radiation into a second conversion region of the device. The second source, different from the first source and whose luminance level is typically less high, is provided with light-emitting units of submillimetric dimensions. The beams produced by the device respectively in the first region and in the second region have different characteristics and complement one another to produce one or more lighting functions.

20 Claims, 2 Drawing Sheets

(51) Int. Cl.

| | |
|---|---|
| *F21S 45/43* | (2018.01) |
| *F21S 41/14* | (2018.01) |
| *F21S 41/663* | (2018.01) |
| *B60Q 1/08* | (2006.01) |
| *F21S 41/60* | (2018.01) |
| *F21S 41/155* | (2018.01) |
| *F21S 41/176* | (2018.01) |
| *F21S 41/153* | (2018.01) |
| *F21S 45/70* | (2018.01) |
| *F21K 9/64* | (2016.01) |
| *F21S 41/16* | (2018.01) |
| *F21S 41/125* | (2018.01) |
| *F21S 41/65* | (2018.01) |
| *B60Q 1/14* | (2006.01) |
| *B60Q 1/20* | (2006.01) |
| *F21S 45/47* | (2018.01) |

(52) U.S. Cl.
CPC .............. *F21K 9/64* (2016.08); *F21S 41/125* (2018.01); *F21S 41/14* (2018.01); *F21S 41/153* (2018.01); *F21S 41/155* (2018.01); *F21S 41/16* (2018.01); *F21S 41/176* (2018.01); *F21S 41/18* (2018.01); *F21S 41/60* (2018.01); *F21S 41/65* (2018.01); *F21S 41/663* (2018.01); *F21S 45/43* (2018.01); *F21S 45/70* (2018.01); *B60Q 2300/312* (2013.01); *F21S 45/47* (2018.01)

(58) Field of Classification Search
CPC .......... F21S 41/65; F21S 45/43; F21S 41/663; F21S 41/60; F21S 41/18; F21S 41/155; F21S 41/14; F21S 45/47; B60Q 1/20; B60Q 1/1415; B60Q 1/085; B60Q 2300/312; F21K 9/64
See application file for complete search history.

(56) References Cited

U.S. PATENT DOCUMENTS

| | | | |
|---|---|---|---|
| 2016/0195232 A1* | 7/2016 | Boinet | F21S 41/16 |
| | | | 362/510 |
| 2016/0195244 A1* | 7/2016 | Harada | F21V 13/14 |
| 2018/0003357 A1* | 1/2018 | Park | F21S 41/16 |
| 2018/0031201 A1* | 2/2018 | Seitz | F21S 41/40 |
| 2019/0113200 A1* | 4/2019 | Murakami | F21S 2/00 |

FOREIGN PATENT DOCUMENTS

| | | |
|---|---|---|
| KR | 10-2016-0107774 | 9/2016 |
| WO | WO 2014/205466 A1 | 12/2014 |

\* cited by examiner

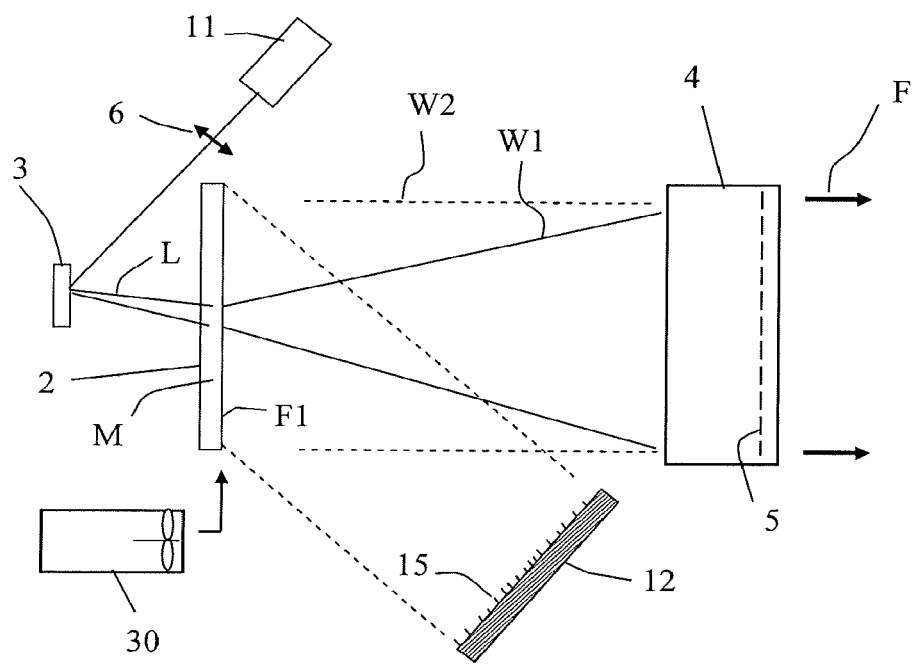
Fig. 3
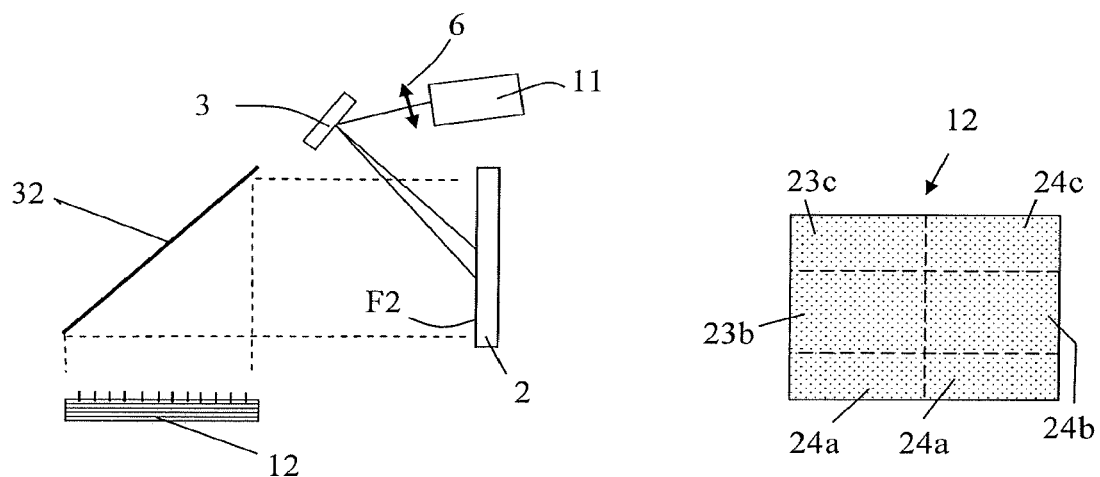
Fig. 4     Fig. 5

LIGHTING DEVICE FOR A VEHICLE, COMBINING TWO LIGHT SOURCES

The present invention relates to a light device, making it possible to produce a lighting function for a vehicle. More particularly, the invention relates to a lighting device for a vehicle (typically a motor vehicle), comprising:
- a wavelength conversion device (typically comprising converting crystals or converting analogue solids distributed in a layer of the conversion device, or even molecules of colorant dispersed in the layer);
- a first light source emitting a first light radiation;
- a scanning system receiving the first light radiation and projecting it by scanning onto a first conversion region defined by the wavelength conversion device.

The Patent Application US20140029282 A from VALEO VISION describes an example of lighting device of this kind, in which the light source is either a single laser source, for example a laser diode whose wavelength can correspond to a colour ranging from blue to the near ultraviolet, or an optical device combining, in a single beam, several laser radiations, for example using optical fibres or devices exploiting different polarizations of different laser sources.

The wavelength conversion device, of the luminophore plate type, receives the laser ray through the scanning system and emits, in a determined general direction, a radiation in the visible. The luminophore plate can be situated in the immediate vicinity of the focal plane of an optical imaging system, which then forms at affinity an image of the luminophore plate, or, more precisely, of the points or sectors of this plate (points or sectors defined typically by converting crystals or other generally solid chemical elements having the requisite property) which emit white light in response to the laser excitation that they receive. The wavelength conversion device has an output face, facing the optical imaging system. The distribution of the converting crystals or solid chemical elements is homogeneous in the conversion layer of the luminophore plate. The expression "luminophore plate" describes a structure including at least one layer of a material based on different chemical elements having the requisite wavelength conversion property.

To obtain, in practice, a complete beam which satisfies the regulation for low-beam type lighting, it is necessary to have a significant power (several tens of watts) for the laser source and, because of this, consequently, it is essential to multiply the mirror microelectromechanical systems (MEMS), which increases the cost of the lighting device. Indeed, without distribution and at the requisite maximum power, an existing microsystem would be destroyed by the radiation from the laser source.

Furthermore, it would be difficult to multiply the laser sources because it is very complicated to combine the beams of different laser sources in such a way as to have a beam diameter that is sufficiently small both at the scanning system and at the wavelength conversion device.

The invention therefore aims to obtain a light device which provides novel possibilities for the positioning and design of a light, and that is compatible with a good trade-off between lighting performance and reliability.

To this end, the invention relates to a lighting device of the abovementioned type for a vehicle, in particular for the lighting (typically forward lighting) of a motor vehicle, which has:
- a second light source, distinct from the first source, which emits a second light radiation and which includes:
  - a semiconductor light source, comprising light-emitting units of submillimetric dimensions, knowing that the wavelength conversion device is designed and arranged to emit (in one and the same determined general direction):
- a first light beam from the interaction, in the first conversion region, of the first light radiation with the wavelength conversion device, and
- a second light beam from the interaction, in a second conversion region of the wavelength conversion device, of the second light radiation with the wavelength conversion device.

Preferably, the submillimetric electroluminescent units are on the same substrate. They are then epitaxially grown from the substrate.

Preferably, the substrate is composed mainly of silicon.

Preferably each electroluminescent unit comprises a first semiconductor layer, an active layer and a second semiconductor layer, each unit having a light emitting surface. Preferably, each unit is in the form of rods or pad.

Preferably, the luminance of the first light radiation is greater than the luminance of the second light radiation.

By virtue of these provisions, it becomes possible to aggregate the performance advantages linked to the use of a light source typically having a strong luminance and the advantages of a moderate basic lighting obtained without recourse to a scanning system, this moderate lighting resulting from the conversion of the radiation from a semiconductor light source, by operating a conversion device common to two beams.

The light-emitting units of the second light source, by virtue of their submillimetric dimension, in effect allow an effect of pixelization of the lighting, with enhanced beam control possibilities. In particular, the semiconductor light source can be controlled to adjust the intensity of the brightness emitted by the conversion device, for example by obtaining a maximum situated in a range ranging from 60 lux to 100 lux. That advantageously makes it possible to reduce the heating of the luminophore plate.

The semiconductor light source advantageously has control possibilities which do not require a scanning system as for a laser source or equivalent light source and is less costly to produce, with equivalent power, than a laser diode (for example a blue laser emission diode).

According to a particular feature, the first conversion region has a characteristic dimension, typically a diameter or equivalent diameter, which is reduced compared to the dimensions (length and width, or outer diameter as appropriate) of the conversion layer of the conversion device. The ratio between the surface of the scanning system actually used for the projection to the conversion device and the receiving surface of the first region can thus be reduced, even when using a highly miniaturized system (of MEMS type), which reduces the stresses for the microsystem allowing the scanning. Furthermore, the use of one or more laser sources scanned on a restricted surface makes it possible to achieve very high luminances without requiring a power as great as would be necessary by scanning all of the wavelength conversion device (first and second regions).

Regarding the second conversion region, this is larger than the first region such that the second beam is comparatively wider than the first beam. It will in fact be understood that the first beam which results from the interaction with the first light radiation exits from the conversion device with a diameter (or equivalent diameter) that is reduced compared to the second beam. That results from the use of a common projection optic.

According to a particular feature, the wavelength conversion device:

extends in a single piece from a first face to a second face (which is preferably substantially parallel to the first face), and is adapted to emit in a determined general direction, through the first face, the first light beam and the second light beam.

It will be understood that the first conversion region and the second conversion region extend between these two faces, and typically belong to one and the same conversion layer.

According to an option, the light radiation projected by the scanning system arrives at the wavelength conversion device via the first face of the conversion device. In this case, a layer reflecting this light radiation can be provided in the conversion device, on the side of the second face.

Optionally, the reflecting layer can selectively reflect the first radiation, while allowing the second light radiation to pass if the second light source is attached against the second face or placed facing this second face.

Optionally, the reflecting layer can reflect all the visible spectrum, apart from the second light radiation if the second light source is attached against the second face or placed facing this second face.

An interconnect layer, which is preferably configured to make it possible to selectively light all or part of the light-emitting units, can make it possible to activate the light emissions from the light-emitting units by forming subzones or pixels, such subzones being able to have a variable size and luminance. The control of the second light source via such an interconnect layer makes it possible to select different lighting configurations of the light-emitting units. It is possible to modify a size and/or a luminance of the second light beam by modifying the lighting configuration of the light-emitting units.

When the second light source is facing the first face, the reflecting layer can be formed by a mirror which, optionally, can serve as support for the wavelength conversion device.

According to another option, the light radiation projected by the scanning system arrives at the wavelength conversion device via the second face of the conversion device. If the light radiation from the light-emitting units of the second light source arrives at the wavelength conversion device via its first face, a reflecting layer can be provided to selectively reflect this second radiation, while allowing the first radiation to pass.

According to a particular feature, the luminance of the second light radiation can be made non-homogeneous. The luminance can thus be increased locally by emphasizing the density of light-emitting units in a subzone concerned. A homogeneous radiation mode can be provided by default (the heterogeneous mode being an option triggered according to the lighting needs).

Advantageously, the association of the first light source and second light source with a luminophore plate placed behind an optical imaging system (including a projection lens whose exit pupil has a diameter of 40 mm or more) makes it possible to produce the low beam function, and optionally:

the high beam function,
the dynamic bending light function (generally known by the acronym DBL, for "Dynamic Bending Light"), both in low and high beam modes,
range correction without movement of the lighting module;
an adverse weather beam (generally known by the acronym AWL, for "Adverse Weather Light");
a fog beam (then exclusive to the low beam, which is regulatory);
and the high beam function without dazzle (then called ADB, "Adaptive Driving Beam", function).

It must be stressed that the scanning system associated with the first source (typically a laser diode) facilitates the dynamic bending and can vary, if necessary, the perimeter of the first conversion region (region in practice receiving a radiation of stronger luminance, given the different nature of the first light source). This variation of the scanned perimeter can be activated notably for needs associated with bad weather or fast driving of the vehicle with the lighting device installed (for example on motorway or when it is detected that the vehicle is running faster than a determined threshold, for example above 110 km/h).

A lighting device according to the invention can comprise one or more of the following features:

the second light radiation resulting from the emissions of the light-emitting units has a wavelength which is offset relative to the wavelength of the first light radiation, the difference being, for example, greater than or equal to 20 nm (with this arrangement, it is possible to easily produce a safety feature with respect to a laser source or similar source of high luminance, by arranging this first source on the side of the first face and by selectively absorbing the first radiation emitted from this first source by a layer of absorbing the wavelength of the first radiation for example situated in the imaging optic; this makes it possible to prevent, in the event of damage to the luminophore plate, the laser light from being able to be reflected directly outward);

when the second light radiation resulting from the emissions of the light-emitting units has at least two characteristic wavelengths, each of the characteristic wavelengths is offset relative to the wavelength of the first light radiation, the difference being, for example, greater than or equal to 20 nm;

the conversion layer of the wavelength conversion device has a variety of chemical elements making it possible to convert into white light radiations having different wavelengths, which are situated in the visible range and are preferably less than or equal to 500 nm.

The first light source is a laser light source and the first light radiation is a laser radiation.

The laser radiation has a wavelength of between 400 nm and 500 nm.

The second light source is configured to have a luminance of between 30 $Cd/mm^2$ and 50 $Cd/mm^2$.

The second light source comprises at least two selectively activatable zones.

The at least two zones are configured so as to have a luminance different from one another.

The at least two zones are configured so as to have a size different from one another, and a different number of light-emitting units of submillimetric dimensions.

The second light radiation emitted by the second light source is of a wavelength less than or equal to 500 nm.

The wavelength of the second light radiation is controlled as a function of the wavelength of the first light radiation.

The second light source is attached to the wavelength conversion device via an absorbent layer, the absorbent layer consisting of a material suitable for absorbing the first light radiation.

An optical system is provided for receiving the first and second light beams emitted by the wavelength conversion device, the optical system comprising at least one dioptre of a diameter greater than or equal to 40 mm and/or at least one dioptre allowing the lighting device to operate as a low beam.

The second light source is adapted to emit, directly or indirectly, the second light radiation towards the first conversion region.

The scanning of the first light radiation on the first conversion region is performed at variable speed.

The first conversion region and the second conversion region are collocated in one and the same conversion layer of the wavelength conversion device, the conversion layer being preferably based on at least one material including the luminophore.

The wavelength conversion device comprises a wavelength conversion layer deposited on a layer of a substrate based on a material chosen from the materials that are good thermal conductors.

Other features and advantages of the invention will become apparent from the following description of several embodiments thereof, given as nonlimiting examples, in light of the attached drawings in which:

FIG. 3 is a view similar to FIG. 1, illustrating a lighting device according to a second embodiment of the invention;

FIG. 4 illustrates a variant positioning of the wavelength conversion device that can be used in a third embodiment of the invention;

FIG. 5 illustrates a front view showing an example of second light source which has different zones with light-emitting rods.

In the different figures, the same references denote identical or similar elements.

Figure 1:
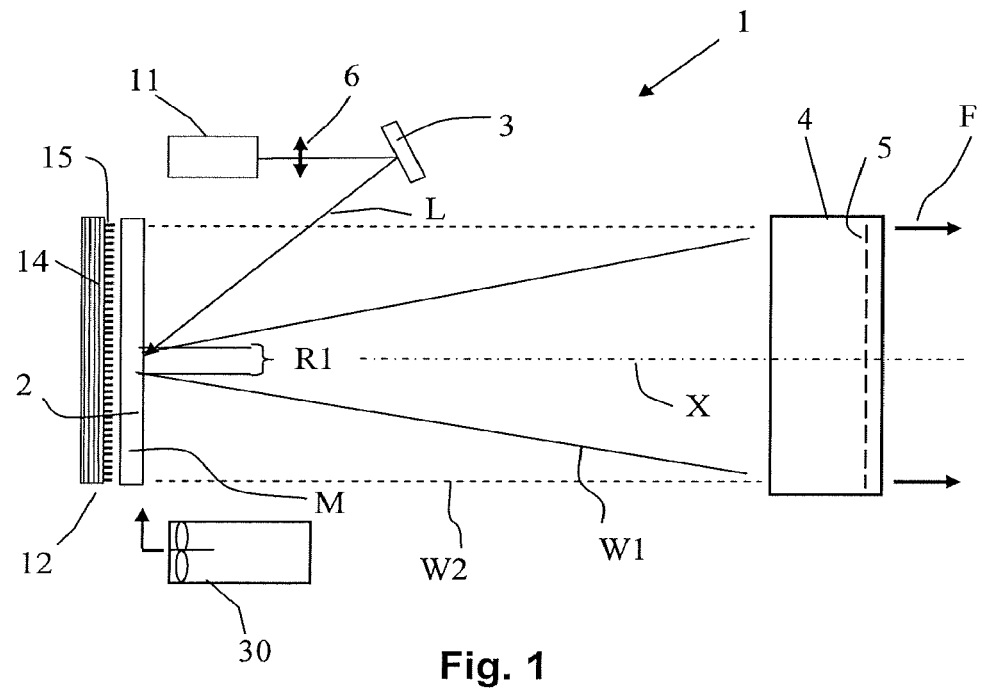
FIG. 1 is a schematic view of a lighting device according to a first embodiment of the invention.
Figure 2:
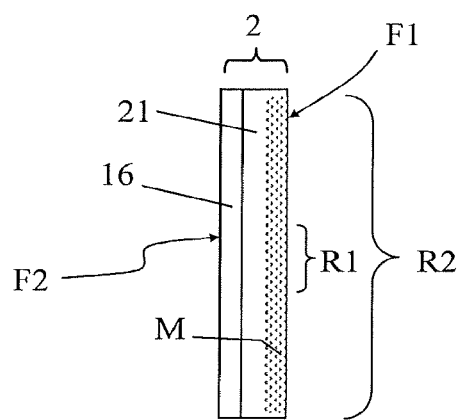
FIG. 2 is a schematic view in cross section illustrating a wavelength conversion device that can be used to receive the emissions of the first light source and of the second light source.

FIGS. 1 and 2 represent a first embodiment of a lighting device 1 that can form part of a motor vehicle light, for example a front light. The lighting device 1 can be installed in a tightly sealed housing and at least partly surrounded by an outer jacket of the vehicle. As is known per se, the light can have a front lens (not represented) through which the light rays of the exiting beam F can pass.

Here, the lighting device 1 comprises two light sources 11 and 12 associated with one and the same wavelength conversion device 2. The power supply for these two respective light sources 11, 12 is of electrical type and of a kind that is known per se. Generally, hereinbelow, the electrical power supply of the components of the lighting device 1 is not represented, in order to avoid unnecessarily cluttering the figures.

The scanning system 3 shown in FIG. 1 is provided to intercept the first light radiation emitted by the first light source 11 and return, by reflection, this light radiation L towards a face (non-absorbent and typically transparent), here a first face F1, of the wavelength conversion device 2. The first light source 11 is typically a laser source comprising, for example, a laser diode. As is known per se, an optical imaging system 4 is placed between the wavelength conversion device 2 and the lens, in order to transmit an exiting beam F in a determined direction. Such an optical imaging system 4 is provided with at least one dioptre 5 or equivalent device defining an exit pupil whose diameter is greater than or equal to 40 mm. It will be understood that the optical system 4 makes it possible to fulfil at least the low beam function.

The first light source 11 also comprises conventional focusing optical means 6 and allows a laser ray to be emitted whose wavelength lies between 400 nanometres and 500 nanometres, and preferably close to 450 or 460 nanometres. These wavelengths correspond to colours ranging from the blue to the near ultraviolet. The scanning system 3, of conventional type, comprises, in the example described, a single micromirror, mobile about two orthogonal axes.

Referring to FIG. 1, the light radiation L of laser type is reflected by the micromirror towards a first conversion region R1 of the wavelength conversion device 2. The radiation specific to this wavelength conversion device 2 is transmitted towards the optical imaging system 4.

Referring to FIG. 2, the first conversion region R1 can correspond to a small zone which is central in the conversion layer 21 formed in the wavelength conversion device 2. The conversion layer 21 covers a substrate layer 16 which here exhibits a reflecting effect for the light radiation L of laser type, at least in a central zone adjacent to the first conversion region R1.

In a preferred embodiment, the wavelength conversion device 2 is deposited on a substrate chosen from the materials that are good thermal conductors. The substrate layer 16 can thus dissipate the heating in the first conversion region R1. As illustrated in FIG. 1, this first region R1 is passed through by the optical axis X of the optical imaging device 4.

The wavelength conversion device 2 extends in a single piece from the first face F1 to a second face F2 substantially parallel to the first face F1, such that it has a plate format. The first face F1 here constitutes a single outer face through which can be transferred all of the useful radiation of the wavelength conversion device 2, in a determined general direction.

In this first embodiment, the scanning system 3 and the optical imaging system 4 are arranged on the same side, which corresponds to the reflection side of the substrate layer 16. On this same side, the substrate layer 16 can be covered by a continuous and homogeneous layer forming the conversion layer 21. A luminophore plate is thus formed. In the conversion layer, at least one material M with phosphorescent (or possibly fluorescent) property is present. As is known, each point of this conversion layer 21 receiving the laser radiation L (here, this monochromic radiation is coherent and received in the first conversion region R1), re-emits towards the optical imaging system 4 a light W1 of different wavelength, and in particular a light which can be considered to be as "white", that is to say which comprises a plurality of wavelengths between approximately 400 nanometres and 800 nanometres, that is to say lying in the spectrum of the visible light. This light emission occurs, according to a Lambertian emission pattern, that is to say with a uniform luminance in all the directions.

As can be clearly seen in FIG. 2, the conversion layer 21 has a more extensive conversion region R2 that is more extensive than the first region R1 and which includes the first, more central region R1. This region R2 can correspond to all or part of the conversion layer 21. In the embodiment illustrated in FIG. 2, the conversion layer 21 interacts also with a second light radiation which passes through (by the rear) the second face F2 of the wavelength conversion device 2.

This second light radiation, of lower luminance than the first light radiation from the first light source 11, is generated by a semiconductor light source (14, 15) which has a plurality of light-emitting units 15 of submillimetric dimensions. These units have a rod shape. Each of these light-emitting rods 15 extends like a thread from a common surface. The light source (14, 15) is defined by a chip or similar optoelectronic device, for example substantially of the same kind as the device described in the document WO 2016/001200. The optoelectronic device can comprise groups of light-emitting rods 15 each associated with a control circuit.

Referring to FIG. 5, light-emitting rods 15 are distributed in several groups corresponding to zones 23a, 23b, 23c et 24a, 24b, 24c of the second light source 12. These zones 23a, 23b, 23c and 24a, 24b, 24c are selectively activatable. It is possible for example to illuminate according to different modes, for example, and in a nonlimiting manner:
- all the zones apart from bottom zones 23a, 24a;
- all the zones apart from top zones 23c, 24c;
- all the zones situated on one and the same side (right or left), that is to say either the zones 23a to 23c, or the zones 24a to 24c;
- only intermediate zones 23b and 24b.

More generally, the second light source adds a flexibility of adjustment of the lighting zones, and makes it possible to divide these zones in the manner of pixels. Obviously, the greatest dimension (side if it is a square format, diameter it is a round format) of the second light source is then greater than 5 mm and typically greater than or equal to 10 mm. It will be understood that this control makes it possible to more finely adjust the image projected to infinity by the optical imaging system 4 and/or the luminance desired for the exiting beam F.

At least some of the zones 23a, 23b, 23c and 24a, 24b, 24c are optionally configured so as to have a luminance that is different from one another. As an example, the second light source 12 has at least two zones which are configured so as to have:
- a different size relative to one another, and
- a different number of light-emitting rods 15 of submillimetric dimensions.

The structure with light-emitting rods 15 makes it possible to obtain a very high light extraction efficiency. The second light radiation emitted by the second light source 12 is for example of a wavelength less than or equal to 500 nm (while preferably remaining greater than, equal to, or slightly less than 400 nm), which makes it possible to interact optimally with the conversion layer 21.

Referring to FIGS. 1 and 2, the optoelectronic device here forming the second light source 12 can emit a blue or UV light from an exit face which is oriented towards a second conversion region R2 of the wavelength conversion device 2. The first region R1 can be contained in this second conversion region R2. In other words, the conversion layer 21 of the wavelength conversion device 2 is totally lit by the combination of the first light radiation and of the second light radiation. In the example of FIG. 1, the second light source 12 directly emits the second light radiation towards the conversion layer 21, in the determined general direction, such that it reaches all of the first conversion region R1.

The conversion layer 21 based on luminophore material (often phosphorescent) can then be considered as a second radiation source, consisting of a light image (resulting here from the combination of the first light radiation and of the second light radiation), whose optical imaging system 4 forms an image at infinity, for example on a screen placed at a distance in the axis X of the optical system 4 and at right angles to this axis.

The second light source 12 is here placed behind the wavelength conversion device 2 which for example takes the form of a thin plate or blade of luminophore (for example with Zérodur®-type ceramic substrate, having a great thermal stability).

The density of light-emitting rods 15 is adjusted to obtain a moderate luminance, of the order of 30 to 50 Cd/mm$^2$, sufficient to obtain a maximum intensity of the order of 60 lx to 100 lx on the axis at 25 m, reducing the heating of the wavelength conversion device 2. A cooling module 30 is typically provided to reduce the heating in the conversion layer 21 where the white light is generated. An airflow is generated by the cooling module. Alternatively, a heat exchange can be produced by the use of a liquid material and/or a phase-change material.

A luminophore layer can also be formed directly on the second light source 12. In this option, the light-emitting rods 15 are advantageously encapsulated in a conversion layer 21 (consisting of luminophores encapsulated in a silicone polymer). It is then possible to consider that the substrate layer 16 is a silicon substrate (good thermal conductor) of the second light source 12 (silicon substrate which is then located behind the light-emitting rods 15). This substrate can be coated with a reflecting layer (aluminium anode for example).

If the wavelength of two respective light sources 11 and 12 is sufficiently different, it is possible to ensure a safety function by stopping the wavelength of the laser with a band-stop filter situated for example in the optical system 4. That does not prevent white light from being obtained; for a blue laser application, the necessary blue component can be provided by the second light source 12 with light-emitting rods 15.

In a preferred embodiment, an interface, for example in the form of an interconnect layer, makes it possible to produce a pixel lighting, each pixel being associated with a defined number of light-emitting rods 15 of the optoelectronic device. Thus, it is possible to control the form and the intensity of the beam of white light W2 from the second conversion region R2.

As a nonlimiting example, the lighting device 1 produces a headlight function for a motor vehicle, notably a low beam function. If necessary, it is possible to form pixels whose size and luminance vary according to the zones addressed on the second light source 12. It is optionally possible to obtain a maximum for luminances by variations of column densities.

In the first embodiment, it is understood that the second light radiation has a wavelength sufficiently different from the wavelength of the laser radiation L, in order for the substrate layer 16 which has a reflecting or absorbent effect for the laser radiation L to be able to allow the second light radiation to pass. Here, the second light source 12 is attached to the wavelength conversion device 2 via the substrate layer 16.

In a preferred option, the wavelength of the second light radiation can be chosen in such a way in order, for example, to differ sufficiently from the wavelength of the first light radiation.

By having two beams of white light W1 and W2 produced by a common conversion layer 21 of one and the same wavelength conversion device 2, it is possible to access a wide variety of functions without the risk of deterioration or destruction of the scanning system 3, because the power required for the first light source 11 remains very much lower than what is required, for example, for a low beam lighting function, when a single laser source is used.

The light beam F emerging from the optical imaging system 4 is directly a function of the light rays (white light) emitted by the conversion layer 21, which are themselves a function:

of the laser radiation L which scans this layer 21 in the first conversion region R1; and of the radiation from the light-emitting rods 15.

A control unit (not represented) can drive the different components 3 and 11 producing the laser radiation L, as well as the light radiation produced by the light-emitting rods 15, according to the desired photometry of the exiting beam F. In particular, the control unit simultaneously drives the scanning system 3 and the first light source 11, for the associated radiation, here the laser radiation L, to successfully scan points of the first conversion region R1. The amplitude of the scanning can be adjusted if necessary to concentrate the radiation on certain points of the first conversion region R1 (the light trace defined by the laser radiation L can have the form of a dot, a larger spot, even an oblong mark). The intensity of the laser radiation L can be adjusted by this driving.

Simultaneously, in particular for the low beam function and other functions used when driving a vehicle, the control unit can activate a selection of the zones 23a, 23b, 23c, 24a, 24b, 24c of the second light source 12 and/or adjust the luminance corresponding to each of these zones.

Thus, it is possible with the same light of the motor vehicle to obtain the position light function (front light in this case), with an exiting beam F which defines a greater lighting surface, when the weather conditions permit it, and as fog light (case typically applicable to a rear light) with a more intense exiting beam F which defines a reduced lighting surface, when the weather conditions are more difficult, with heavy rain or fog for example.

In one option, not represented in the figures, a light function modification system is linked to the lighting device 1. This modification system can be controlled using a computer of the vehicle as a function of driving parameters. Alternatively or in addition, this modification system is controlled by a manual control that can be actuated from the interior of the vehicle by the driver. In this case, it is the driver who chooses when to change the function of the light.

When a laser radiation L is generated by the first light source 11, the lighting device 1 can be associated with a safety module which has failure detection means. Thus, in the case of failure of the wavelength conversion device 2 or of the scanning system 3, it is possible to automatically cut or reduce the luminance (by interposition of a dispersive material or a suitable filter for example) of the laser source.

One advantage of combining a wavelength conversion device 2 by covering a light source with light-emitting rods is, as in the case illustrated in FIG. 1 corresponding to the first embodiment, to be able to use a second source which can be compact and directly attached to the conversion layer 21. With this type of solution, there is no need to add to the wavelength conversion device a specific projection optic for the second light source 12.

A second embodiment of the lighting device 1 will now be described with reference to FIG. 3.

The lighting device 1 shown in FIG. 3 differs from the first embodiment essentially in that the positions of the second light source 12 and of the scanning system 3 are different. The structure of the scanning system 3, of the optical imaging system 4 and of the sources 11 and 12 can remain the same. The first light source 11 is of laser type and the wavelength of the first light radiation is significantly different from the wavelength of the light-emitting rods 15 of the second light source 12. The difference is such that the thermal drifts, within the range of use, are insufficient to fill the wavelength difference.

Here, the scanning system 3 is optionally positioned behind the conversion layer 21, whereas the second light source 12 is situated on the side of the first face F1. The wavelength conversion device 2 then differs in that it has a bottom which allows the laser radiation L to pass to reach the conversion layer 21. A layer which disperses this laser radiation L can be provided on the side of the first face F1. Furthermore, provision can be made to reflect the second light radiation by a reflecting surface, at least one or more in the regions peripheral to the central zone passed through by the laser radiation L. In this case compatible with FIG. 3, a projection optic (not represented) is situated between the second source 12 and the first face F1. Since the emission from the light-emitting rods 15 is not directional, it will be understood that it is preferable to orient, by an intermediate optical device, the radiation from the second light source 12 before reaching the wavelength conversion device 2. It is then also possible to obtain a pixelization of the second light source 12 by virtue of the intermediate optic.

Because of the recourse to an intermediate optical device, it is advantageously possible to use a source 12 of clearly smaller size (in particular lesser circumference) than the conversion layer 21, which constitutes an economic advantage.

Depending on the needs, it is also possible to involve several optoelectronic devices each emitting a second light radiation which passes through the first face to excite the material M with phosphorescent property (luminophore) in the conversion layer 21. It will be understood that the wavelength conversion device then makes it possible to combine two beams of white light W1 and W2.

In a variant embodiment, when both the scanning system 3 and the second light source 12 are facing the first face F1, the wavelength conversion device 2 can have a reflecting layer (for example in the form of a mirror) which forms an integral part of the wavelength conversion device 2 or can serve as support for this wavelength device 2. A third embodiment of the lighting device 1 will now be described with reference to FIG. 4.

The lighting device 1 shown in FIG. 4 differs from the first embodiment essentially in that the positions of the second light source 12 and of the scanning system 3 are different. The structure of the scanning system 3 and of the sources 11 and 12 can remain the same. The optical imaging system and the optional cooling module are not represented for the purpose of simplification. The first light source 11 is of laser type. The wavelength of the first light radiation is significantly different from the wavelength of the light emitted by the light-emitting rods 15 belonging to the second light source 12.

More particularly here, the scanning system 3 is optionally positioned behind the wavelength conversion device 2 to project the first light radiation towards the first conversion region, whereas the second light source 12 emits the second light radiation indirectly towards the second conversion region, through a mirror 32, a prism or any other optical projection system.

The wavelength conversion device 2 differs typically in that has no bottom layer or has a bottom layer allowing the respective radiations which pass through the second face F2 to pass to reach the conversion layer 21. When the first light source 11 is a laser diode or similar source of laser radiation, it is possible for example to provide a layer which reflects this laser radiation, on the side of the first face F1, towards the face F2.

In this example, the heating of the luminophore plate of the wavelength conversion device 2 can be dissipated on both sides (first face F1 and second face F2), by using, for example, outer layers based on a material chosen from the materials that are good thermal conductors.

The arrangement illustrated in FIG. 4 allows the use of a second light source 12 of a size significantly smaller than the size of the conversion layer 21 (and therefore economical), an optical projection device (for example the mirror 32) making it possible to enlarge the image of this source 12 to the size of the region R2.

Depending on the needs, it is also possible to involve several optoelectronic devices which each emit a second light radiation passing through the second face F2 to excite the material M in different points of the conversion layer 21. In this option, it is possible, if necessary, to provide an arrangement, attached or not relative to the second face F2, of the optoelectronic devices around a central passage provided for the laser radiation. This makes it possible to position the scanning system 3 more towards the rear than one or more of the optoelectronic devices. For cost and bulk reasons however, it is generally preferable to use a second light source 12 formed of a single piece.

It will be understood that the wavelength conversion device 2 then makes it possible to combine two beams of white light W1 and W2, as in the embodiments previously described. These beams W1 and W2, produced by the wavelength conversion device 2 respectively in the first conversion region R1 and in the second conversion region R2, have different characteristics and complement one another to produce one or more lighting functions.

It should be obvious to the person skilled in the art that the present invention allows embodiments in numerous other specific forms without departing from the scope of the invention as claimed.

Thus, although the scanning system 3 has been presented as sufficiently fast to scan a single first region R1 of the wavelength conversion device 2, it will be understood that this scanning system 3 can also, alternatively or in addition, scan spot zones or subregions which are spaced apart from one another.

Also, although the second light source 12 has been illustrated in the drawings as having a single semiconductor light source provided with light-emitting rods 15 and of relatively large dimensions (of the order of a centimetre for example), it will be understood that the light source 12 can have at least two semiconductor units each provided with light-emitting rods 15 designed separately and grouped together in the lighting device 1 to form the second light radiation which is received by the wavelength conversion device 2.

The arrangements illustrated are nonlimiting and the lighting device can have other arrangements. For example, in a variant not illustrated in the figures, the first light source 11 of laser type, the second light source 12 and the optical system 4 can be placed on the same side in relation to the wavelength conversion device 2 (fairly similar to the case of FIG. 3, but with the laser radiation L originating from the other side).

The invention claimed is:
1. Lighting device for a vehicle comprising:
a wavelength conversion device;
a first light source emitting a first light radiation;
a scanning system receiving the first light radiation and projecting it by scanning onto a first conversion region of the wavelength conversion device;
a second light source emitting a second light radiation and which includes:
a light source with semiconductors comprising light-emitting units of submillimetric dimensions,
wherein the wavelength conversion device is configured to emit
a first light beam from an interaction, in the first conversion region, of the first light radiation with the wavelength conversion device, and
a second light beam from the interaction, in a second conversion region of said wavelength conversion device, of the second light radiation with the wavelength conversion device.

2. Device according to claim 1, wherein the wavelength conversion device extends in a single piece from a first face to a second face substantially parallel to the first face, and is adapted to emit in a determined general direction, through the first face, the first light beam and the second light beam.

3. Device according to claim 1, wherein the first light source is a laser light source and the first light radiation is a laser radiation.

4. Device according to claim 3, wherein the laser radiation has a wavelength of between 400 nm and 500 nm.

5. Device according to claim 1, wherein the second light source is configured to have a luminance of between 30 $Cd/mm^2$ and 50 $Cd/mm^2$.

6. Device according to claim 1, wherein the second light source comprises at least two selectively activatable zones.

7. Device according to claim 6, wherein the at least two selectively activatable zones are configured so as to have a luminance different from one another.

8. Device according to claim 7, wherein the at least two selectively activatable zones are configured so as to have:
a size that is different to one another, and
a different number of light-emitting units of submillimetric dimensions.

9. Device according to claim 1, wherein the second light radiation emitted by the second light source is of a wavelength less than or equal to 500 nm.

10. Device according to claim 1, wherein the wavelength of the second light radiation is controlled as a function of the wavelength of the first light radiation.

11. Device according to claim 1, wherein the second light source is attached to the wavelength conversion device via an absorbent layer, the absorbent layer consisting of a material suitable for absorbing the first light radiation.

12. Device according to claim 1, wherein the device comprises an optical system receiving the first and second light beams emitted by the wavelength conversion device, the optical system comprising at least one dioptre allowing the lighting device to operate as a low beam.

13. Device according to claim 1, wherein the second light source is adapted to emit, directly or indirectly, the second light radiation towards the first conversion region.

14. Device according to claim 1, wherein the scanning of the first light radiation on the first conversion region is performed at variable speed.

15. Device according to claim 1, wherein the first conversion region and the second conversion region are collocated in one and the same conversion layer of the wavelength conversion device, the conversion layer being preferably based on at least one solid material including luminophore.

16. Device according to claim 1, wherein the wavelength conversion device comprises a wavelength conversion layer deposited on a layer of a substrate based on a material chosen from the materials that are good thermal conductors.

17. Device according to claim 1, wherein the light-emitting units are, at least for a part of them, selectively activatable via an interconnect layer, such that there are several configurations of illumination of the light-emitting units, a size and/or a luminance of the second light beam being modifiable by modifying the configuration of lighting configurations of the light-emitting units.

18. Device according to claim 2, wherein the wavelength conversion device extends in a single piece from a first face to a second face substantially parallel to the first face, and is adapted to emit in a determined general direction, through the first face, the first light beam and the second light beam.

19. Device according to claim 2, wherein the second light source is configured to have a luminance of between 30 Cd/mm$^2$ and 50 Cd/mm$^2$.

20. Device according to claim 2, wherein the second light source comprises at least two selectively activatable zones.

\* \* \* \* \*